M. GOLEIN.
FLYING MACHINE.
APPLICATION FILED APR. 12, 1919.

1,366,255.

Patented Jan. 18, 1921.

Inventor
Mark Golein

Victor J. Evans
Attorney

UNITED STATES PATENT OFFICE.

MARK GOLEIN, OF BROOKLYN, NEW YORK.

FLYING-MACHINE.

1,366,255.  Specification of Letters Patent.  Patented Jan. 18, 1921.

Application filed April 12, 1919. Serial No. 289,566.

*To all whom it may concern:*

Be it known that I, MARK GOLEIN, residing at Brooklyn, in the county of Kings and State of New York, have invented new and useful Improvements in Flying-Machines, of which the following is a specification.

This invention relates to new and useful improvements in flying machines, and pertains more particularly to safety appliances therefor.

The primary object of the invention is to provide a safety device for aeroplanes which is in the form of a parachute.

A further object of the invention is to provide a parachute of sufficient dimensions as to be capable of operation to serve to check the descent of an aeroplane in case of accident thereto while in flight.

A further object of the invention is to so construct a parachute as to render the same capable of being folded in such a manner as to offer no interference to the successful operation of the machine in flight.

A further object of the invention is to provide means for effecting an operation of the planes simultaneously with the operation of the parachute.

Referring to the drawings.

Figure 1:
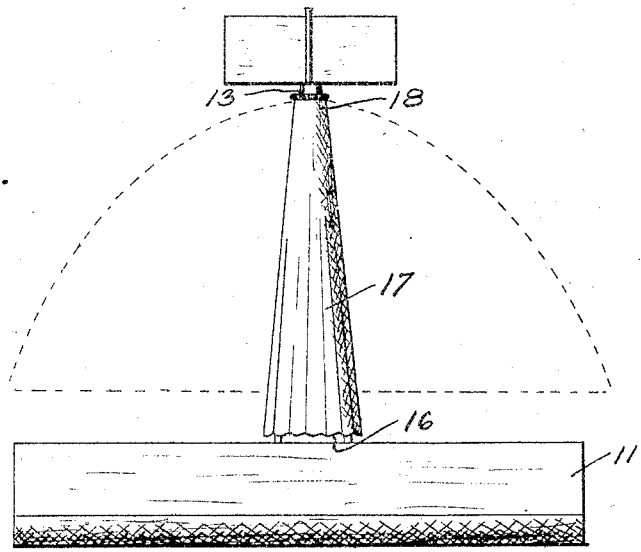
Figure 1 is a side view of a conventional type of aeroplane, showing the parachute folded in its inoperative position.
Figure 2:
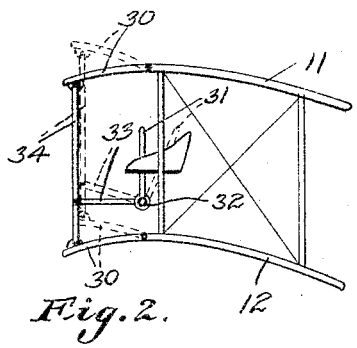
Fig. 2 is a similar view showing the parachute extended.
Figure 3:
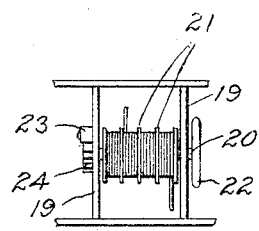
Fig. 3 is a detail view of one of the planes.
Figure 4:
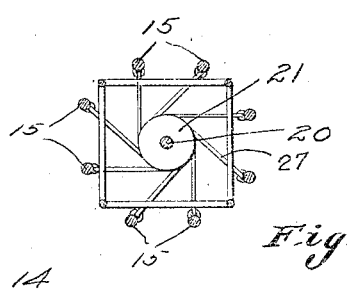
Fig. 4 is a detail view of the operating mechanism for the planes.

Referring more particularly to the drawings, the reference character 10 designates the fuselage of the machine, the upper and lower planes being designated by the reference characters 11 and 12 respectively.

Figure 5:
Fig. 5 is a detail view of a portion of one of the rib members showing parts in section.

Extending around the fuselage 10 of the machine near the rear end thereof is a circular band 13, and pivotally secured around said band at equi-distantly spaced intervals are the ribs 14. The band 13, is preferably formed of steel, the ribs being also formed of steel, and are hollow as shown in Fig. 5.

Sliding within the hollow ribs 14, are extensible rib members 15 and to the outer ends of said sliding ribs is secured the peripheral edge 16, of the body 17, of the parachute, the central portion 18 of the parachute 17 being secured to the fuselage at the metal band 13.

Mounted in suitable bearings 19 in the fuselage 10 is a shaft 20, and secured to and adapted to be rotated by said shaft 20 is a plurality of pulleys or drums 21. The shaft 20 is rotated by means of a spoked hand wheel 22, and is held in position by means of the dog 23 which engages the gear wheel 24.

The number of pulleys 21 is determined by the number of ribs 15 and leading from an eye 26 formed on each rib 15 to its respective pulley is a small wire 27. These wires 27 are adapted to be wound around their respective pulleys to maintain the parachute in its folded position when not in use.

The planes 11 and 12 are each provided on their forward edge with a hinged section 30 which is adapted to be moved to elevate the machine, and these hinged sections are operated by means of a lever 31 which is positioned in the fuselage adjacent the driver's seat. From this construction it will be seen that the center of gravity of the machine can be changed or shifted when the machine occupies a dangerous position where the operator cannot right the same. When thus shifted the center of gravity is in line with the longitudinal axis of the fuselage which causes the parachute to open promptly as will be understood.

This lever 31 is connected to a shaft 32 which extends longitudinally of the planes 11 and 12, and is connected by means of the bell crank levers 33 to the links or rods 34 which in turn are connected at their opposite ends to the hinged sections 30 of the planes. By this construction it will be seen that the two hinged sections of the planes 11 and 12 are operated simultaneously.

In operation, if through accident, the machine should start a rapid descent, the lever 31 is operated to rock the shaft 32 and elevate the forward hinged sections of the aeroplane to cause the machine to elevate and prevent what is commonly termed "nose diving."

As this operation is completed, the link 35 serves to release the dog or pawl 23 and permit of the unwinding of the spools 21 thus allowing the parachute to unfold to retard the descent of the machine and cause the same to reach the ground without any undue shock or strain.

In a modified form of the invention the upper and lower planes are each provided with a hinged section which in turn is controlled by means of a link operated by the same lever which serves to operate the forward hinged sections of the planes. By this construction, it will be seen that when the forward hinged sections are operated to cause the machine to elevate, the rear hinged sections are likewise operated to release the free ends of the ribs of the parachute and release the same to operative position.

Having thus described the invention what is claimed is:

1. In an aeroplane, a fuselage, a parachute secured to the tail end of the fuselage, means for normally holding the parachute closed against the fuselage, means for releasing the parachute to permit the same to open, planes carried by the fuselage and provided with hinged sections, and means for operating said sections concurrently to shift the position of the center of pressure with relation to the longitudinal axis of the fuselage prior to operating the parachute releasing means.

2. In an aeroplane, a fuselage, a parachute secured to the tail end of the fuselage, means for normally holding the parachute closed, means for releasing the parachute to permit the same to open, planes carried by the fuselage and provided with hinged sections, and means for operating said sections concurrently to shift the center of pressure of the machine in line with the longitudinal axis of the fuselage prior to operating the parachute releasing means.

In testimony whereof I have affixed my signature.

(CAPT. SIR) MARK GOLEIN.